United States Patent [19]
Chaban

[11] Patent Number: 5,738,475
[45] Date of Patent: Apr. 14, 1998

[54] ADJUSTABLE EXPANSION RIVET

[75] Inventor: Philip A. Chaban, Grass Lake, Mich.

[73] Assignee: Lear Corporation, Southfield, Mich.

[21] Appl. No.: 771,279

[22] Filed: Dec. 20, 1996

[51] Int. Cl.[6] .............................. F16B 19/08; E05D 13/00
[52] U.S. Cl. ..................... 411/501; 411/903; 16/193
[58] Field of Search ........................ 411/501, 506, 411/507, 903; 16/193, 273, 274

[56] References Cited

U.S. PATENT DOCUMENTS

| | | |
|---|---|---|
| 1,503,859 | 8/1924 | Stimpson . |
| 2,302,501 | 11/1942 | Mears ................................... 218/29 |
| 3,497,909 | 3/1970 | Davis .................................... 16/193 |
| 3,505,923 | 4/1970 | Neill . |
| 4,088,053 | 5/1978 | Tyree ..................................... 411/501 |
| 4,177,545 | 12/1979 | Lambertz ............................ 411/501 X |
| 4,202,243 | 5/1980 | Leonhardt . |
| 4,221,041 | 9/1980 | Hufnagl et al. ......................... 29/512 |

*Primary Examiner*—Neill R. Wilson
*Attorney, Agent, or Firm*—Young & Basile, PC

[57] ABSTRACT

An adjustable expansion pivot rivet for connecting a movable member to a fixed member having a cylindrical exterior surface, a hollow interior portion with a terminating portion and a solid interior portion such that the hollow interior portion extends through the fixed member and the terminating portion and solid interior portion extends into the movable member, the hollow interior portion expanding in the hole of the fixed member to fill therein, and the termination portion and solid interior portion defining a gap forming a reservoir for lubricant in the movable member.

12 Claims, 4 Drawing Sheets

ADJUSTABLE EXPANSION RIVET

BACKGROUND OF THE INVENTION

The present invention relates, in general, to a rivet for securing a moveable member to a fixed support, and more specifically for use in adjusters for vehicles seats. The invention provides an improvement to a generally tubular rivet such that it provides an adjustable expansion means to secure the moveable material to the fixed support.

DESCRIPTION OF THE ART

Power seat adjusters are a popular option on many automotive vehicle and are frequently offered as standard equipment on higher priced vehicles. Such power seat adjuster are primarily used on a driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slideably mounted on a lower track anchored to the vehicle floor. A drive mechanism typically includes an electric motor which bi-directionally rotates a pair of drive shafts extending outward from the motor to a gear assembly or box mounted on each upper track. In one arrangement, each gear rotates a lead screw extending longitudinally below each upper track. A drive block is fixedly mounted to each lower track and threadingly receives the lead screw to cause reciprocal, horizontal movement of the upper track and the attached seat support frame upon selective energization of the drive motor and the drive shafts.

Each drive mechanism typically includes a drive motor having a rotatable output shaft connected to a gear assembly either directly in the case of a front and rear vertical drive mechanisms or by means of two shafts extending from a single motor to separate gear assemblies mounted on each upper track or on the seat support frame in the case of a rear recliner drive mechanism.

In the front and rear edge vertical adjustment drive mechanisms, the lead screw is usually threaded into one end of a tubular drive nut. The other end of the tube is formed with a slot which is mounted about one end of a drive link and pivotally connected thereto by a pivot pin. The drive link is fixedly mounted on a torsion tube which extends between mounting brackets on the upper track of the pair of track assemblies of the power seat adjuster. Another end or portion of the drive link is pivotally connected to a flange or leg extending from the upper seat support frame in the case of the front drive link or for the rear driver link to a slave link which is pivotally connected to a flange or leg extending from the rear end of the upper seat support.

Rotation of the lead screw in either direction causes linear movement of the drive nut and thereby a pivotal movement of the drive link in either a clockwise or counter clockwise direction to elevate or lower the front end of the upper seat support frame. Since the drive link is fixed on one of the torsion tube, rotation of the drive link results in simultaneous rotation of the torsion tube, which rotation is transmitted to the drive link on the opposed track assembly thereby resulting in simultaneous elevation or lowering of both front edges of the upper seat support frame.

Seat adjuster components are designed to withstand normal occupant loads and also to resist movement during collision to enable the vehicle restraint systems to function in a proper manner. When a vehicle is impacted from the rear, the impact forces cause the occupant to be thrown rearwardly into the seat back. If the rear impact forces are high enough, occupant load on the seat back tends to deflect the seat back rearwardly from its normal upright position about it pivot connection to the seat track assembly. If the angle or deflection of the seat back is high enough, the occupant could be propelled over the seat back, particularly if the occupant is not wearing a seat and/or shoulder belt.

Also during a rear collision, the lower tracks of the seat adjuster move forward with the vehicle, while the upper seat tracks and seat bottom are subjected to occupant forces which tend to move the upper seat tracks rearwardly. This imposes high forces on the seat adjuster which could cause upward bending of the torsion tube. This deformation leads to rotation of the front drive link beyond its full elevation limit of travel and causes further rotation of the front end of the seat adjuster upwardly and rearwardly resulting in greater rearward deflection of the upper portion of the seat back.

At the same time, the rear drive links which are connected to a rear torsion tube and by a slave link to the rear edge of the seats support frame are subjected to the same access rotational forces which are exacerbated by the continued upward and rearward rotation of the front edges of the seat support frame. Such forces could cause rearward and downward rotation of the rear drive links which drops the rear end of the seat bottom causing the occupant to strike the seat back at a high point thereby increasing the deflection load on the seat back.

As a result an anti-rotational means has been employed with the drive and/or slave links of a vehicle power seat adjuster which does not require significant modification to existing power seat adjuster component design and that provides support beyond normal and limit of travel of the upper and lower and rear seat supports. The anti-rotational means is provided to either or both of the front and rear drive links in slave links of a power seat adjuster. As described above, the drive and slave links require the connection of a movable member with fixed member. To improve the function of the drive and slave links of the anti-rotation means, it is desirable to provide connection means that maintains the fixed member in a secured position while allowing the connected moveable member rotating movement.

SUMMARY OF THE INVENTION

The present invention is an adjustable expansion pivot rivet for use when connecting a moveable member to a fixed member that may be especially adaptable for use in a vehicle seat adjuster. This could also include seat adjusters having anti-rotational movement beyond a normal end limit of travel upon rear impact loading as what occurs in the event of a rear collision with the vehicle.

In the embodiment of a power seat adjuster which includes an upper seat support frame member having a first leg projecting therefrom, a torsion tube extends between and is coupled to the upper tracks of the first and second track assemblies. A link means is carried on the torsion tube and is pivotal with respect to the longitudinal access along the torsion tube for moving the first leg and the upper seat support frame member. Cooperating surface means are carried with the first leg and the links means and disposed for engagement of the first leg and the link means upon movement of the link means beyond a normal end travel limit to resist continued rotation of the links means.

The cooperating surface means includes a first flange carried with and extending angularly from a link, and means carried with the first leg and lying in a path of rotation of the first flange for engaging the first flange upon rotation of the link beyond the normal and travel limit. The cooperating surface means includes a first flange carried with and extending angularly from a first link and a second flange carried with and extending angularly from the first leg of the upper seat support frame member. Preferably the first and second flanges are respectively substantially perpendicular to the first link and the first leg. The torsion tube is rotatably coupled for each upper track of the first and second track assemblies. A drive link is fixedly carried on the torsion tube to rotate the torsion tube upon rotation of the drive link by a drive means. Another drive link is mounted on the other end of the torsion tube in conjunction with the opposed upper track assembly. An opposed upper seat support frame member also has first leg extending therefrom. The drive means is connected to a first end portion of one drive link. An end portion of the other drive link is rotated by rotation of the torsion tube to simultaneously elevate one end of both of the upper seat support frame members.

Alternately, the rotating means include a second link fixedly connected to the torsion tube and drive means, connected to the second link, for rotating the second link and the torsion tube. Preferably the drive link and the second link are integrally formed as a one piece member fixedly carried on the torsion tube. The anti-rotational means resists continued rotation of the front edge of the upper support frame of the vehicle seat adjuster beyond a normal end travel limit upon rear impact loading on the vehicle. The cooperated surface means or flanges forming the anti-rotational means of the invention may be formed on the conventional front drive links and leg extending from the front edge of the upper seat support frame without an extensive modification to such components.

If the anti-rotation means is applied to the rear elevating mechanism of a power seat adjuster a flange is formed on the slave link or strut pivotally connected between the rear drive link and a leg extending from the rear end of an upper seat support frame. The flange on the slave link or strut engages the leg on the upper seat support to resist further rotation of the slave link and the rear end of the upper seat support beyond its normal fully rotated travel position.

To prevent slippage between the aforementioned linkage, as well as, between other similar connections attaching a movable link to a fixed link, an adjustable expansion pivot rivet is disclosed for use. The rivet of the present invention is generally tubular and has a controlled depth hollow portion that is calculated based on the thicknesses of the links. The hollow portion also has a terminating portion that may include a tapered end, spherical end or a flat planar end. The outside surface of the rivet, before insertion into aligning apertures in the moveable and fixed links, is coated with a lubricant along its axial length. When inserted through the apertures, the hollow portion penetrates fully the fixed link and partially the movable link such that the interior terminating portion is disposed fully in the movable link. The thickness of the rivet along its axial length will determined the amount of expansion of the rivet under pressure. The hollow portion of the rivet expands under pressure to encompass the entire aperture and thus eliminating the lubricant in that area. The tapered end and spherical end will have progressively less expansion as the rivet thickness increases. The solid portion of the rivet will not expand to fill the aperture and thereby protects a film of lubrication along its corresponding outer surface. As the linkage moves, the terminating portion and solid portion of the rivet will wear to fit the movable link. The lubrication film on the outer surface of the solid portion of the rivet will migrate to limit the wear of the rivet. This connection will allow a controlled movement of the movable link relative to the fixed link.

Other objects, advantages and applications of the present invention will become apparent to those stated in the art when the following description of the best made contemplated for practicing the invention is read in conjunction with the accompanying drawings.

BRIEF DESCRIPTION OF THE DRAWING

The various features, advantages and other uses of the present invention will become more apparent by referring to the following detailed description and drawing in which.

DESCRIPTION OF THE ILLUSTRATED EMBODIMENTS

Figure 1:
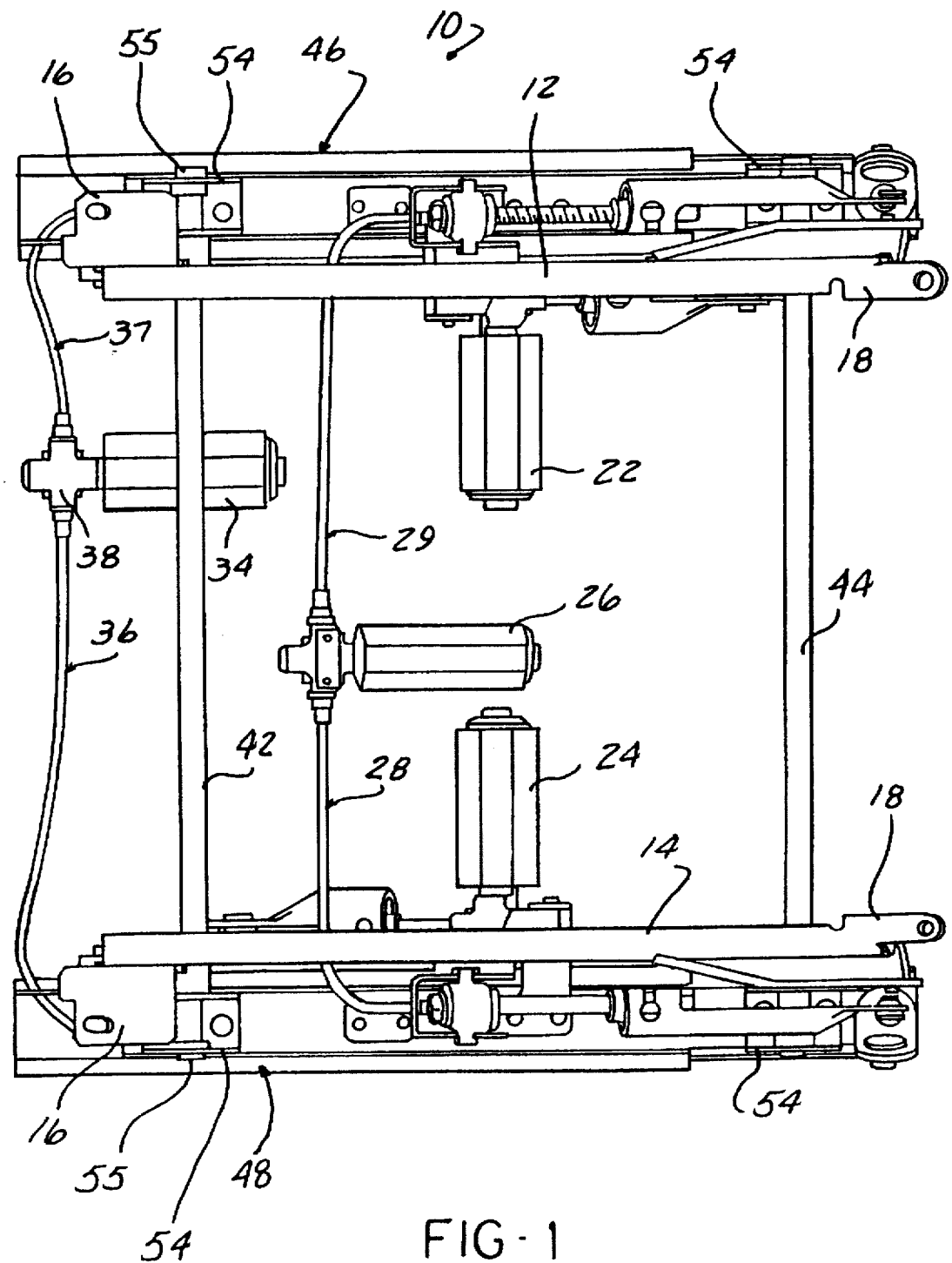
FIG. 1 is a plan view of a power seat adjuster.
Figure 2:
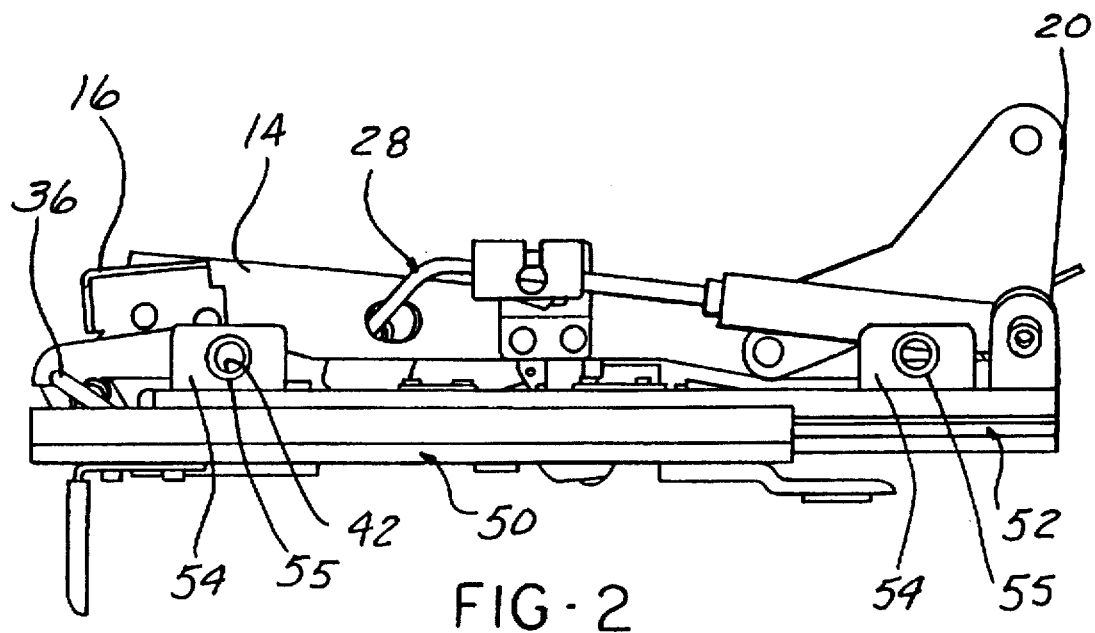
FIG. 2 is a side elevational view of the power seat adjuster shown in FIG. 1.

The invention of an adjustable expansion pivot rivet will be described in terms for use on a power seat adjuster, although, it is apparent to those skilled in the art that the invention has other applications, wherein a movable structure is connected to a fixed structure. For now, the invention will be illustrated as described in the power seat adjuster. Referring to the drawings, and to FIGS. 1 and 2 in particular, there is illustrated a power seat adjuster 10 which variably positions an automotive vehicle seat in any occupant selected position. The power seat adjuster 10 is a so-called "eight-way" adjuster providing horizontal fore/aft, vertical up and down, independent movement of each of the front and rear edges of the adjuster, as well as pivotal tilting of the seat back with respect to the seat bottom. It will be understood, however, that the present invention described hereafter is employable with a power seat adjuster which includes independent front and rear edge vertical adjustment mechanisms or vertical adjustment of the entire seat adjuster as in a "four-way" seat adjuster. It is further understood that the adjustable expansion pivot rivet is employable in other environments such as hood hinges on vehicles, automotive window regulators, and recliner chairs.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 to provide a mounting surface for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10.

Various drive assemblies are mounted on the power seat adjuster 10 to provide selective movement of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, and, thereby, to provide selective vertical adjustment of the front and rear edges of the vehicle seat. In addition, a seat back recliner drive motor 26 drives a pair of rotatable drive shafts 28 and 29, which are coupled to individual lead screws, each carried in one of the two track assemblies.

The power seat adjuster 10 also includes a horizontal drive means formed of a bi-directional electric motor 34 which is fixedly mounted to one of the upper tracks of the power seat adjuster 10 by means of a suitable bracket, not shown. A pair of rotatable drive shafts 36 and 37 extend outward from a gear assembly or box 38 integrally connected to the output shaft of the drive motor 34 to a rotatable connection with a lead screw disposed in each of a pair of opposed track assemblies as described hereafter.

As each of the track assemblies 46 and 48 is identically constructed, the following description will be provided for only track assembly 48. It will be understood that the opposite track assembly 46 is constructed in the same manner. The track assembly 48 includes a lower track 50 and an upper track 52. The upper track 52 is slidably disposed within the lower track 50 and is reciprocatingly, bi-directionally movable along the lower track 50 under the control of the horizontal drive means.

The upper track 52 may take any of a number of different configurations which typically include a pair of side walls depending from a top wall and which terminate in flanges which are slidably disposed in channels formed in the lower track 50.

The power seat adjuster 10 also includes front and rear tubular torsion tubes or rods 42 and 44, respectively, which extend between and are connected to the opposed track assemblies 46 and 48 to provide a rigid support structure for the power seat adjuster 10. As shown in FIGS. 1–2, each end of each torsion tube 42 and 44 is rotatably mounted in suitable mounting brackets denoted generally by reference number 54 which are fixed to opposite ends of each upper track 52. A fastener 55, such as a conventional push nut, is mounted on the outer end of each torsion tube 42 and 44 to securely retain each torsion tube 42 and 44 in the associated mounting bracket 54.

Figure 3:
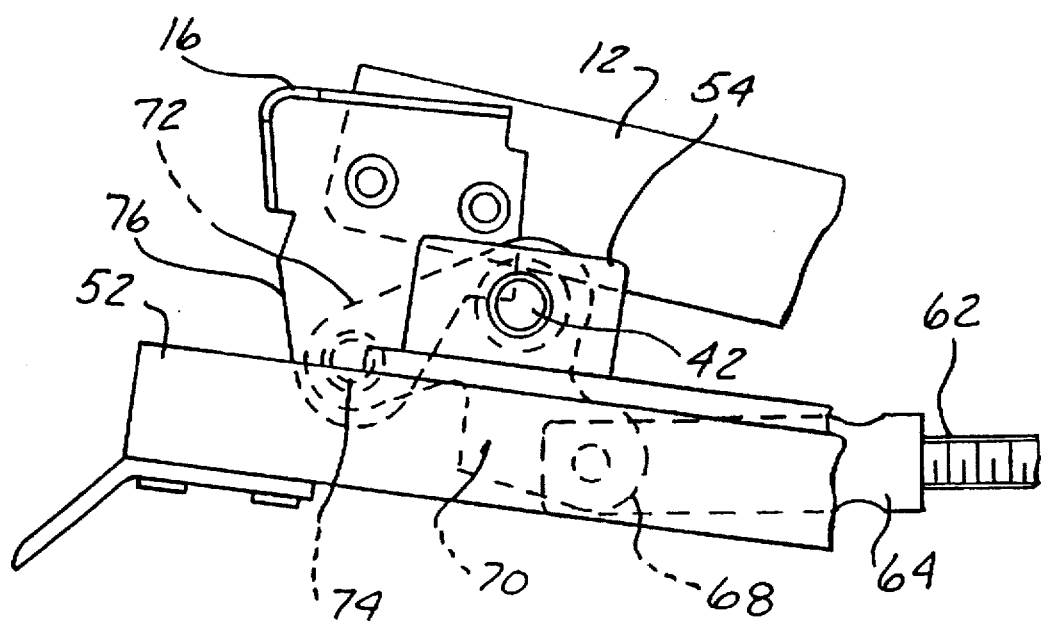
FIG. 3 is an enlarged, partial side elevational view showing the front motion control link of the power seat adjuster shown in FIGS. 1 and 2 deployed in an elevated position.
Figure 4:
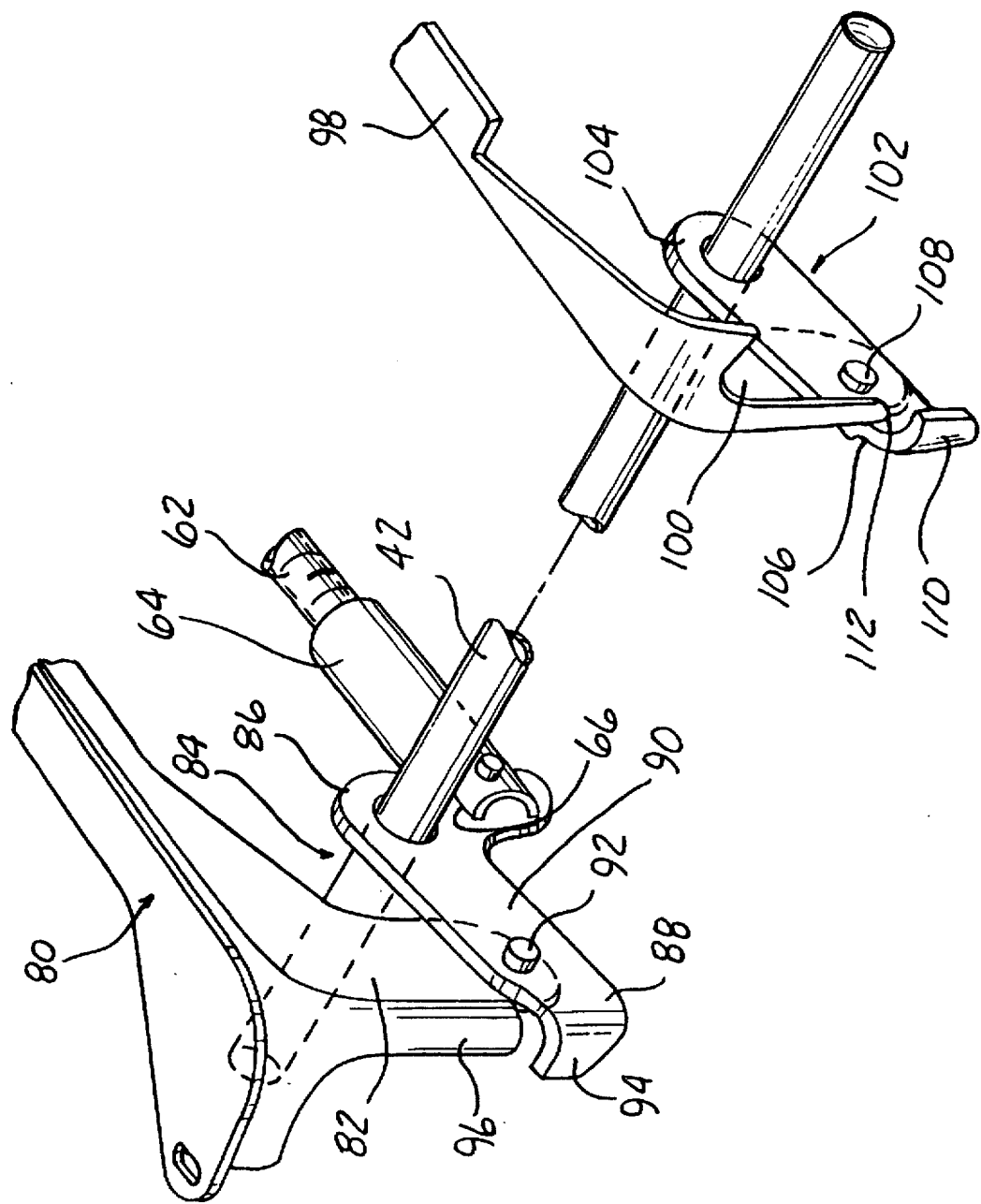
FIG. 4 is a perspective view of a linkage assembly for an anti-rotational vertical adjustment mechanism for a power seat adjuster employing adjustable expansion pivot rivets of the present invention.
Figure 5:
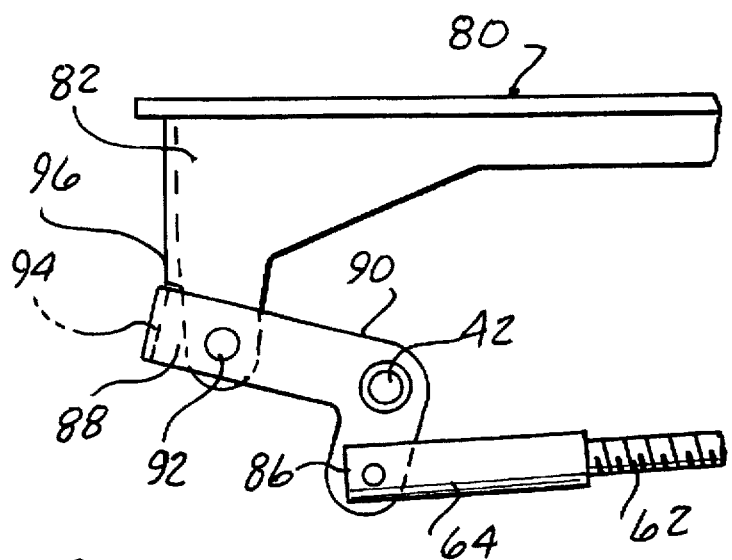
FIG. 5 is a side elevational view of the anti-rotational assembly of FIG. 4 depicting an anti-rotation position.

Referring now to FIGS. 4 and 5, there is depicted an anti-rotational feature to one front drive link 70 which resists continued rotation of the front drive link 70 beyond its fully elevated end limit of travel. In this embodiment, the front edge of the seat support frame 12 and the front mounting bracket 16, shown in FIG. 3 have been combined into an integral one-piece member 80 with a depending leg or flange 82 disposed at a front end.

As shown in FIG. 4, the front master drive control link 84 has a generally planar shape with opposed end portions 86 and 88 extending angularly from an intermediate portion 90. The intermediate portion 90 is fixedly coupled to one end of the front torsion tube 42 by welding, etc. The one end portion 86 is disposed in the slot in the drive nut 64 and pivotally connected to the drive nut 64 by a pivot pin. The other end portion 88 is pivotally connected to leg 82 by an adjustable expansion pivot rivet 92.

Cooperating surface means are carried or formed on the leg 82 and the end portion 88 of the front drive link 84 for cooperating engagement upon a predetermined amount of rotation of the end portion 88 of the front drive link 84 to resist continued rotation of the end portion 88 of the front drive link 84 in a direction beyond its fully elevated end limit of travel which would normally result in continued elevation of the upper seat support frame 80. The cooperating surface means preferably includes a first surface of flange 94 carried at an end of the end portion 88 of the front drive link 84. The first flange 94 is angularly disposed from the plane of the front drive link 84, and is, by way of example only, disposed substantially perpendicular to the plane of the front drive link 84. A second surface or flange 96 is formed on the leg 82 of the upper seat support 80. The second flange 96 is angularly disposed from the plane of the leg 82, and is substantially perpendicular to the plane of the leg 82, by way of example.

The first and second flanges 94 and 96 are formed with suitable lengths and at suitable positions on the end portion 88 of the front drive link 84 and the leg 82, respectively, to lie in the plane of rotation of each other so as to be brought into intersecting engagement or interference upon a predetermined amount of rotation of the end portion 88 of the front drive link 84 such as would occur if the end portion 88 rotates further clockwise from its fully elevated end travel position shown in FIG. 4 to a position shown in FIG. 5.

In a normal, fully elevated seat bottom position, as shown in FIG. 4, at which the front drive link 84 is at its end limit of travel, the first and second flanges 94 and 96 are normally spaced apart. However, upon clockwise rotation of the end portion 88 beyond its normal fully elevated position as would result of a high force rear impact on the vehicle, the first flange 94 moves into engagement with the second flange 96 as shown in FIG. 5. This engagement resists further continued rotation of the end portion 88 of the front drive link 84 which would normally cause continued rotation and elevation of the front end of the upper seat support 80. The metal to metal contact between the first and second flanges 94 and 96 provides a high strength connection which resists such continued rotation.

As also shown in FIG. 4, the opposite upper seat support frame 98 also has a depending leg 100 at a front end. A front slave drive link 102 is fixedly mounted at a first end 104 to an opposite end of the front torsion tube 42. The front slave drive link 102 has a generally planar shape with a second opposed end 106 spaced from the first end 104. Since the front slave drive link 102 is fixedly coupled, such as by welding, to the front torsion tube 42, rotation of the front torsion tube 42 by the front master drive link 84, as described above, through movement of the drive nut 64 by rotation of the threaded lead screw 62, the front slave drive link 102 will rotate in the same direction as the front master drive link 84. The front slave drive link 102 is pivotally connected to the leg 100 of the upper seat support frame 98 by another adjustable expansion pivot rivet 92.

Cooperating surface means are also formed on the leg 100 of the upper seat support frame 98 and the front slave drive link 102. In the same manner as described above, the cooperating surface means comprises a first flange 110 extending angularly from the second end 106 of the front slave drive link 102 and a flange or surface 112 formed on the leg 100 of the upper seat support frame 98. The flanges 110 and 112 are similarly formed and angularly oriented in the same manner as the flanges 94 and 96 described above on the opposed leg 82 and front master drive link 84. In this manner, both pairs of flanges 94 and 96 and 110 and 112 are brought into interfering engagement upon continued rotation of the front drive links 84 and 102 beyond their fully elevated normal positions.

The anti-rotational link means may also be employed on the rear elevating mechanism of the power seat adjuster 10 exclusively or in conjunction with the use of the anti-rotational link means on the front elevating mechanism as described above. Although not discussed in detail, a rear elevating mechanism of the power seat adjuster would incorporate the adjustable expansion pivot rivet of the present invention in the same environment as used in the front elevating mechanism.

Figure 6:
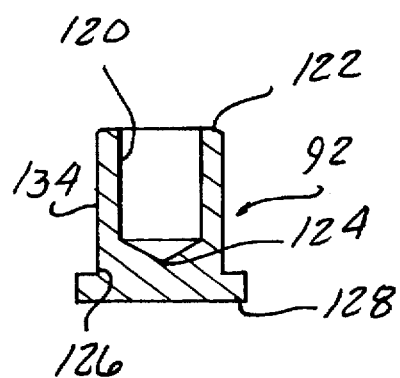
FIG. 6 is a sectional view of the adjustable expansion pivot rivet of the present invention.
Figure 7:
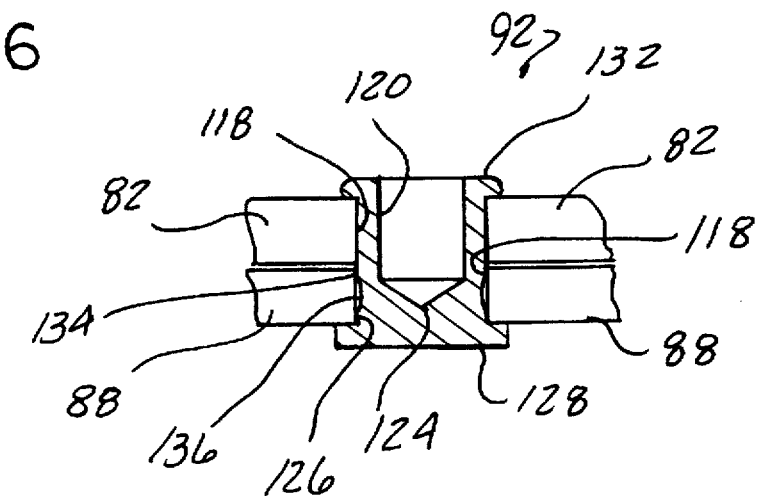
FIG. 7 is a sectional view movable portion secured to a fixed portion by the adjustable expansion pivot rivet.

To provide an improved mounting to connect any one of the pivoting portions 88 and 102 to its corresponding fixed portion 82 and 98 respectively, an adjustable expansion pivot rivet 92 is mounted through aligned apertures 118 in the pivoting 88, 102 and fixed portions 82, 98. Referring to FIG. 6, the improved cylindrical rivet 92 of the present invention has a controlled depth hollow portion or bore 120 penetrating inward from one end 122. The length of the bore 120 depends upon the combined thickness of the two links 82 and 88 or 98 and 102. The depth or length of the hollow portion 120 is selected to fully penetrate through the thickness of the fixed portion or link 82, 98 and to extend only partially through a percentage of the thickness of the movable portion or link 88, 102. The end portion of the hollow portion 120 may taper inwardly to define a cone shaped terminating portion 124 as shown in FIGS. 6 and 7, but may also include other configurations to terminate the hollow portion, such as a flat or spherical end (not shown). Looking at FIG. 7 which represents a sectional view of movable portion 88 of the front master drive control link 84 and fixed portion 82 of the seat support 80, the terminating portion 124 extends fully into the movable portion 88. At the end of the rivet 92 adjacent to the solid portion 126 is a head 128. At the opposing end 122 may be an overlapping portion 132 that extends over a adjacent portion of the fixed portion 82.

Before installation, the outer surface 134 of the rivet 92 may be coated with a lubricant along its axial length. When the rivet is installed into aligning aperture 118, the hollow portion 120 expands under pressure to fill the aperture 118 and thereby squeezes out the lubricant from the area. Because the thickness of the rivet determines its expansion under pressure, the terminating portion 124 will have progressively less expansion as the rivet thickness increases if the terminating portion is tapered or rounded. A flat planar terminating portion will not have a gradual thickness, but will have an abrupt change in thickness from the hollow portion 120 to the solid portion 126. The solid portion 126 expansion is negligible, and thereby protects the film or reservoir 134 of lubricant within the gap defined as the space between the outer surface 134 of the rivet and the periphery of the aperture 118 along the axial length of the tapered or rounded terminating portions 124 and solid portions 126. As the movable link pivots, the lubricant in the reservoir 136, migrates to limit wear at the aperture.

While the invention has been described in connection with what is presently considered to be a practical and an illustrated preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law. Other such embodiments that this invention would further be applicable is in the environment of recliner chairs, and especially those having integral foot rests, hood hinges on vehicles, and automotive window regulators to name a few.

What is claimed is:

1. An adjustable expansion pivot rivet connecting a movable member to a fixed member at aligning apertures therein comprising:

a generally cylindrical outer surface having a hollow portion and a solid portion, wherein said hollow portion extends through said fixed member and said solid portion extends into said movable member, said outer surface coated with a lubricant; and said hollow portion has an end defining a terminating portion, the terminating portion confining expansion of the hollow portion into contact with the movable member leaving a gap between the solid portion and the movable member defining a lubrication reservoir.

2. The adjustable expansion pivot rivet of claim 1, wherein the hollow portion of said rivet extends a limited distance into said movable member.

3. The adjustable expansion pivot rivet of claim 1, wherein said hollow portion of said rivet expands to fill the aperture in the fixed member.

4. The adjustable expansion pivot rivet of claim 1 further comprising a head at one end, wherein said head is located adjacent the movable member.

5. The adjustable expansion pivot rivet of claim 1, wherein said hollow portion has another portion defining a terminating portion adjacent to said solid portion.

6. The adjustable expansion pivot rivet of claim 5, wherein said terminating portion extends to the exposed surface of the movable member.

7. An adjustable expansion pivot rivet connecting a movable member to a fixed member at aligning apertures therein comprising:

a head and a shank, wherein said shank has a generally cylindrical outer surface and an opening forming a hollow portion and a solid portion therein, wherein said hollow portion has a length such that it extends through said fixed member and a portion of said movable member, said hollow portion has an end defining a terminating portion said terminating portion confining expansion of the hollow portion into contact with said movable member leaving a gap between the solid portion and the movable member defining a lubrication reservoir on the corresponding outer surface in the movable member.

8. A structure comprising:

a movable member and a fixed member disposed in facial contact therewith, said movable member having an aperture aligned with an aperture in the fixed member;

an adjustable expansion pivot rivet disposed in said aligned apertures, said rivet having an essentially cylindrical outer surface, wherein said outer surface has a coating of lubricant thereon, and a hollow portion formed by a concentric opening extending therethrough and having an end defining a terminating portion, the terminating portion confining expansion of the hollow portion into contact with the movable member leaving a gap between the periphery of the aperture in the movable member and the outer surface at the terminating portion to define a lubrication reservoir.

9. The structure of claim 8 wherein the terminating portion end is disposed within the aperture of the movable member.

10. The structure of claim 8, wherein the concentric opening extends the entire thickness of the fixed member.

11. The structure of claim 8, wherein said hollow portion is tightly installed in said fixed member.

12. The structure of claim 8, wherein the terminating portion extends through the thickness of the movable member.

* * * * *